United States Patent
Dalluge et al.

(10) Patent No.: US 8,720,854 B2
(45) Date of Patent: May 13, 2014

(54) FLOATING BALL VALVE SEAL WITH DYNAMIC C-SEAL AND STATIC C-SEAL

(75) Inventors: Paul R. Dalluge, Marshalltown, IA (US); Lonnie O. Davies, Jr., Newton, IA (US); William V. Fitzgerald, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 650 days.

(21) Appl. No.: 12/771,950

(22) Filed: Apr. 30, 2010

(65) Prior Publication Data

US 2011/0266482 A1 Nov. 3, 2011

(51) Int. Cl.
F16K 25/00 (2006.01)

(52) U.S. Cl.
USPC ...... 251/159; 251/172; 251/174; 251/315.11; 251/316

(58) Field of Classification Search
USPC ............. 251/314, 316, 317, 315.01, 315.1, 251/315.11, 315.13, 159, 172, 174; 137/15.17, 15.22, 15.09
See application file for complete search history.

(56) References Cited

U.S. PATENT DOCUMENTS

| | | | | |
|---|---|---|---|---|
| 3,218,024 A * | 11/1965 | Werner | ............................ | 251/58 |
| 3,301,523 A * | 1/1967 | Lowrey | ............................ | 251/172 |
| 3,421,733 A * | 1/1969 | Stewart, Jr. | .................... | 251/172 |
| 3,598,363 A * | 8/1971 | Shaw | ............................ | 251/172 |
| 4,084,608 A * | 4/1978 | Laignel et al. | ................. | 137/316 |
| 4,155,536 A * | 5/1979 | Saiki | ............................ | 251/332 |
| 4,519,579 A * | 5/1985 | Brestel et al. | ................. | 251/172 |
| 5,313,976 A * | 5/1994 | Beasley | ...................... | 137/15.22 |
| 8,113,484 B2 * | 2/2012 | Hostetter et al. | .............. | 251/180 |
| 2001/0045231 A1* | 11/2001 | Monod | ....................... | 137/454.2 |
| 2009/0095931 A1* | 4/2009 | Stunkard | ....................... | 251/174 |

FOREIGN PATENT DOCUMENTS

| | | |
|---|---|---|
| DE | 1266594 B | 4/1968 |
| EP | 228150 A1 | 7/1987 |
| EP | 0483611 A1 | 5/1992 |

OTHER PUBLICATIONS

International Search Report for PCT/US2011/032915, dated Jun. 20, 2011.
Written Opinion for PCT/US2011/032915, dated Jun. 20, 2011.
First Office Action issued by the State Intellectual Property Office of China on Dec. 4, 2013 in the corresponding Chinese application No. 201180029049.

* cited by examiner

*Primary Examiner* — John K Fristoe, Jr.
*Assistant Examiner* — Marina Tietjen
(74) *Attorney, Agent, or Firm* — Marshall, Gerstein & Borun LLP

(57) ABSTRACT

A seal assembly is provided for a rotary ball valve having a top-mounted bonnet, thereby allowing the seal assembly to be installed and removed without removing the valve from the pipeline. In an embodiment, the seal assembly may include a seal ring disposed within the valve interior and biased toward the ball element of the valve. A seal carrier may be disposed between the seal ring and the valve body, and the seal carrier may be removably secured to the valve body by a plurality of bolts disposed in the valve interior. A primary leak path may exists between the seal ring and the seal carrier and a secondary leak path may exists between the seal carrier and the valve body. A first and second auxiliary seal may prevent fluid flow through the primary and secondary leak path, respectively.

23 Claims, 7 Drawing Sheets

FLOATING BALL VALVE SEAL WITH DYNAMIC C-SEAL AND STATIC C-SEAL

FIELD OF THE DISCLOSURE

The present disclosure relates to fluid control devices and, more particularly, to rotary ball-type fluid control valves.

BACKGROUND

Rotary ball valves are used in a wide number of process control system applications to control some parameters of a process fluid such as a liquid, gas, slurry, etc. While the process control system may use a control valve to ultimately control the pressure, level, pH, or other desired parameter of a fluid, the control valve basically controls the rate of fluid flow.

Typically, a rotary ball valve includes a valve body defining a fluid inlet and a fluid outlet. A ball element is mounted in the valve body and rotates about a fixed axis into and out of abutment with a seal assembly, thereby controlling the amount of fluid flow through the valve. With typical bolted in-line ball valves, the seal assembly is inserted into the valve body through the fluid inlet, and retained adjacent to a flange of the valve body with a seal protector ring.

Rotary ball valve components, including the valve body, the ball element, and the seal assembly, are typically constructed of metal. This stands especially true when used in high pressure and/or high temperature applications. However, the ball element and seal assembly can suffer wear due to the repeated engagement of the ball element and seal assembly during opening and closing of the valve. The problems resulting from the wear include, but are not limited to, diminished life span of the valve components, increased frictional forces between the ball element and the seal assembly, and undesirable leakage between the ball element and the seal assembly, as well as between the seal assembly and the valve body. Similarly, because the frictional forces tend to increase as the components become more worn, the dynamic performance and control characteristics within the valve are worsened, resulting in inefficiencies and inaccuracies in the valve. To alleviate some of these concerns, some seal assemblies are biased such as to provide a more reliable seal against the ball in the closed position. Regardless of the specific type of seal assembly utilized, most conventional rotary ball valves must be unbolted from the fluid process control system to replace the seal assembly in the event it becomes worn or otherwise ineffective.

SUMMARY

In a first aspect, a valve may include a valve body having an inlet, an outlet, and a valve interior in fluid communication with the inlet and outlet. The valve may also include a bonnet removably secured to a top portion of the valve body. A ball element may be pivotably mounted in the valve interior, and an exterior surface of the ball element may define a portion of a sphere, wherein all points on the exterior surface of the ball element, are not equidistant from a natural pivot point of the ball element. A seal ring may be disposed within the valve interior and biased toward the ball element, and the seal ring may be adapted to sealingly engage the ball element. An anchor ring may be disposed within the valve interior and secured to the valve body. In addition, a seal carrier may be disposed in the valve interior between the seal ring and the valve body, and the seal carrier may be removably secured to the anchor ring by a plurality of bolts that are disposed within the valve interior and adapted to be inserted and removed from within the valve interior. A primary leak path may exist between the seal ring and the seal carrier and a secondary leak path may exist between the seal carrier and the valve body. Each of the primary leak path and the secondary leak path may be exposed to fluid pressure within the valve. A first auxiliary seal may be disposed between the seal ring and the seal carrier, and the first auxiliary seal may prevent fluid flow through the primary leak path. A second auxiliary seal may be disposed between the seal carrier and the valve body, and the second auxiliary seal may prevent fluid flow through the secondary leak path.

In a further aspect, an alignment gap may be formed between the seal ring and the seal carrier, and the alignment gap may define a portion of the primary leak path. The alignment gap may provide a space between the seal carrier and the seal ring that allows the seal ring to radially move relative to the seal carrier such that the seal ring self-aligns when the ball element sealingly engages the seal ring.

In another aspect, the first auxiliary seal disposed between the seal ring and the seal carrier may be a C-seal. Additionally, the C-seal may be disposed in a recess formed in the seal ring. A mouth of the C-seal may open towards a direction of fluid flow in the primary leak path.

In a further aspect, the second auxiliary disposed between the seal carrier and the valve body may be a C-seal. A mouth of the C-seal may open towards a direction of fluid flow in the secondary leak path. The C-seal may be disposed in a recess formed in the seal carrier. The C-seal may sealingly engage a portion of the valve body and a portion of the recess formed in the seal carrier to prevent fluid flow through the secondary leak path.

In a still further aspect, the second auxiliary seal disposed between the seal carrier and the valve body may be an annular gasket.

In another aspect, a wave spring may bias the seal ring towards the ball element, and the wave spring may be disposed in a recess formed in the seal ring.

In a further aspect, the axial displacement of the seal ring away from the seal carrier may be limited by a seal retainer that is coupled to the seal carrier, and the seal retainer may be removably secured to the seal carrier by a plurality of bolts that are disposed within the valve interior.

In another aspect, each of the plurality of bolts may threadedly engage both a threaded bore formed in a flange portion of the seal carrier and a threaded bore formed in the anchor ring.

A method of installing a seal ring assembly may include providing a ball valve including a valve body having an inlet, an outlet, and a valve interior in fluid communication with the inlet and outlet. A bonnet opening may be provided adjacent to a top portion of the valve body. A ball element may be pivotably mounted in the valve interior, and an exterior surface of the ball element may define a portion of a sphere, and all points on the exterior surface of the ball element are not equidistant from a natural pivot point of the ball element. A seal carrier sub-assembly may be assembled in a location not within the valve interior. The seal carrier sub-assembly may include a seal carrier having an inner recess, a seal ring disposed within the inner recess, wherein the seal ring may be adapted to sealingly engage the ball element. The seal carrier sub-assembly may further include a first auxiliary seal disposed between the seal ring and seal carrier and a second auxiliary seal coupled to the seal carrier. The seal carrier sub-assembly may be inserted into the bonnet opening such that the seal carrier sub-assembly is disposed within the valve interior. In addition, the seal carrier sub-assembly may be secured to the valve body such that the first auxiliary seal prevents fluid from flowing through a primary leak path that exists between the seal ring and the seal carrier and such that the second auxiliary seal prevents fluid from flowing through a secondary leak path that exists between the seal carrier and the valve body. A bonnet may be secured to the valve body to cover the bonnet opening.

In another aspect, a valve may include a valve body having an inlet, an outlet, and a valve interior in fluid communication with the inlet and outlet. The valve may also include a bonnet removably secured to a top portion of the valve body. A ball element may be pivotably mounted in the valve interior, and an exterior surface of the ball element may define a portion of a sphere, wherein all points on the exterior surface of the ball element are not equidistant from a natural pivot point of the ball element. A seal ring may be disposed within the valve interior and biased toward the ball element, and the seal ring may be adapted to sealingly engage the ball element. A primary leak path may exist between the seal ring and the valve body, and the primary leak path may be exposed to fluid pressure within the valve. A first C-seal may be non-slidably disposed on an exterior surface of the seal ring, and the first C-seal may sealingly engage the seal ring and a portion of the valve body to prevent fluid flow through the primary leak path. Moreover, fluid pressure in the first C-seal may bias the seal ring towards the ball element. In addition, a relative displacement between the seal ring and the portion of the valve body may result in a spring force provided by the first C-seal that also biases the seal ring towards the ball element.

In a further aspect, the seal ring may be disposed in an inner recess in the interior portion of the valve body, and a clip ring disposed around a portion of the inner recess may limit the axial displacement of the seal ring towards the ball element.

In another aspect, a second C-seal may be non-slidably disposed on the exterior surface of the seal ring, the second C-seal positioned adjacent to the first C-seal, and the second C-seal sealingly engaging the seal ring and the valve body to prevent fluid flow through the primary leak path.

In a still further aspect, at least one alignment gap may be formed between the seal ring and the valve body, and the alignment gap may define a portion of the primary leak path. The alignment gap may provide a space between the seal ring and the valve body that allows the seal ring to radially move relative to the valve body such that the seal ring self-aligns when the ball element sealingly engages the seal ring.

DETAILED DESCRIPTION

Figure 1:
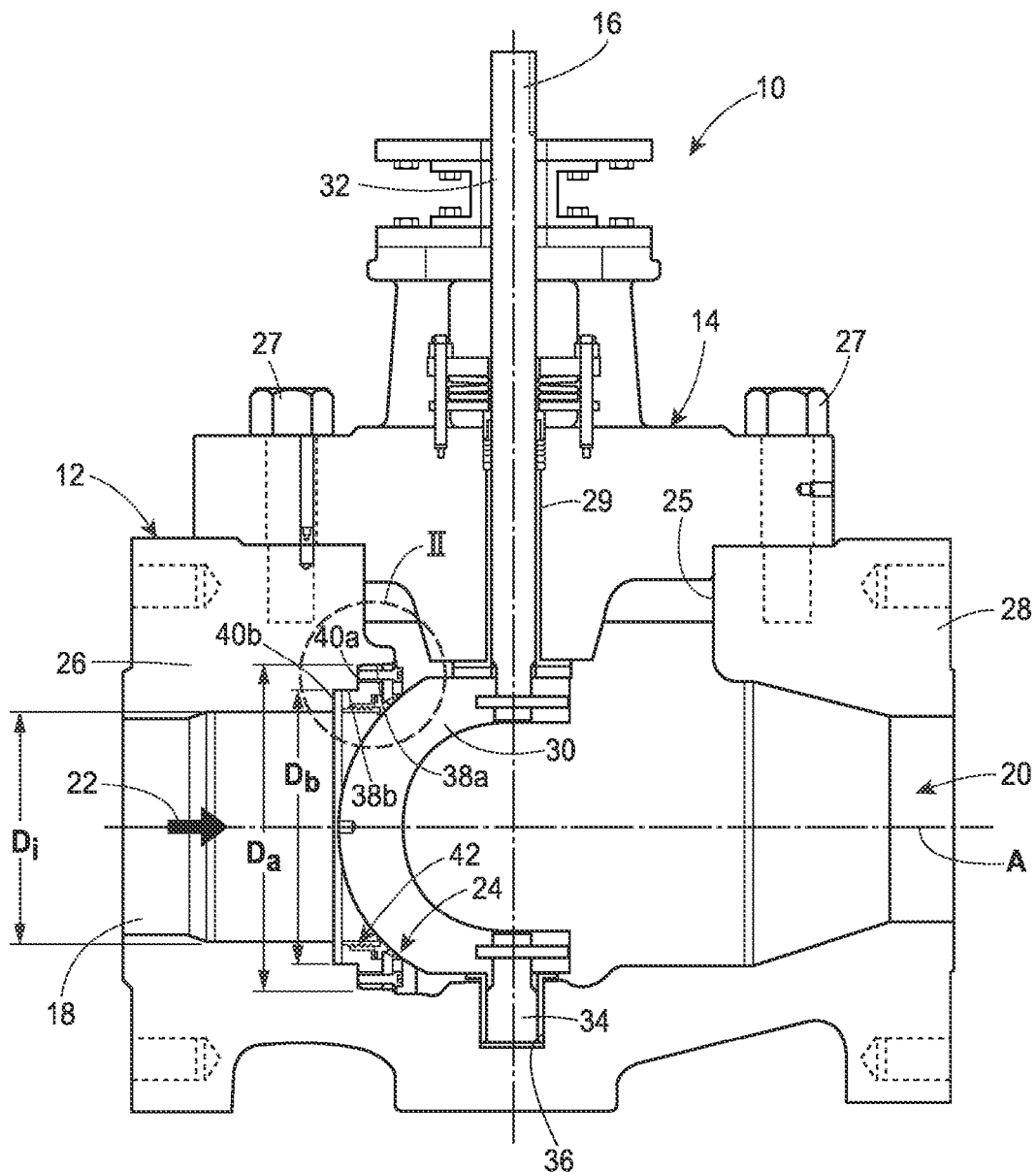
FIG. 1 is a cross-sectional view of a rotary ball valve constructed in accordance with the principles of the present disclosure.

FIG. 1 depicts a rotary ball valve 10 constructed in accordance with the principles of the disclosure, and generally including a valve body 12, a bonnet 14, a control assembly 16, and a seal assembly 24. The valve body 12 has a generally cylindrical shape and includes an inlet portion 18, an outlet portion 20, a primary flowpath 22, and a bonnet opening 25 located adjacent to a top portion of the valve body 12. As indicated by the arrow, the primary flowpath 22 extends from the inlet portion 18 to the outlet portion 20 in a direction that is generally parallel to a longitudinal axis A. The inlet portion 18 is surrounded by an inlet flange 26. The outlet portion 20 is surrounded by an outlet flange 28. The inlet flange 26 and the outlet flange 28 are adapted to couple the ball valve 10 into a process control pipeline such as by bolting, welding, clamping, or any other known means.

The bonnet 14 includes a generally cylindrical structure bolted into the bonnet opening 25 of the valve body 12 with a plurality of bonnet bolts 27. The bonnet 14 defines a through-bore 29 that supports various components of the control assembly 16, as is generally known. The control assembly 16 includes a ball element 30, a drive shaft 32, and a support shaft 34. The drive shaft 32 is disposed through the through-bore 29 in the bonnet 14 and is adapted to be coupled to a rotary actuator in a known manner. The support shaft 34 is disposed within a blind bore 36 formed in a wall of the valve body 12 that is opposite the bonnet opening 25. The through-bore 29 in the bonnet 14 and the blind bore 36 in the valve body 12 can include bearings as is known in the art to facilitate consistent unencumbered rotational displacement of the shafts 32, 34 and, therefore, the ball element 30 during operation of the ball valve 10.

The ball element 30 typically includes a cammed ball element, as is known in the art, to facilitate a repeatable seal with the seal assembly 24 when in the closed position, as shown in FIG. 1. More specifically, an exterior surface of the ball element 30 may define a portion of a sphere, wherein all points on the exterior surface of the ball element are not equidistant from a natural pivot point of the ball element, such as the rotational axis of each of the shafts 32, 34.

In the example shown, the seal assembly 24 is mounted in the valve body 12 at an interior location that is downstream from the inlet portion 18, and generally adjacent to the bonnet opening 25. So configured, when the seal assembly 24 requires replacement, the bonnet 14 and control assembly 16 can be removed from the valve body 12, and the seal assembly 24 is loaded through the bonnet opening 25. This eliminates the need to remove the entire valve 10 from the pipeline, in which it is mounted, to replace the seal assembly 24, which is highly advantageous when the valve 10 is butt-welded into position.

To accommodate the seal assembly 24, the disclosed embodiment of the valve body 12 defines an internal recess 42 disposed completely downstream from the inlet portion 18 of the valve body 12. Said another way, the internal recess 42 is disposed between the inlet portion 18 of the valve body 12 and the ball element 30 of the control assembly 16. The recess 42 of the disclosed embodiment is generally annular in shape and has a stepped profile defined by internal surfaces of the valve body 12 including first and second cylindrical surfaces 38a, 38b, and first and second transverse surfaces 40a, 40b.

The second cylindrical surface 38b is disposed between the inlet portion 18 of the valve body 12 and the first cylindrical surface 38a, when considered relative a direction of the flow path 22 depicted in FIG. 1. Similarly, the second axial surface 40b is disposed between the inlet portion 18 of the valve body 12 and the first axial surface 40a, when considered relative to the direction of the flowpath 22 depicted in FIG. 1.

Moreover, as illustrated, the first cylindrical surface 38a has a first diameter Da that is larger than a second diameter Db of the second cylindrical surface 38b. The first and second diameters Da, Db are each larger than an inlet diameter Di of the inlet portion 18 of the valve body 12.

With the valve body 12 so configured, the seal assembly 24 is mounted in the valve 10 through the bonnet opening 25, as mentioned above, thereby enabling the valve to be used in environments that require the inlet and outlet flanges 26, 28 to be butt-welded in-line, as opposed to bolted in-line configurations. Of course, this design could also be used with bolted valve bodies, or otherwise. Moreover, the seal assembly 24 of the disclosed embodiment is disposed in the internal recess 42 such that when the ball element 30 is closed, as shown in FIG. 1, the seal assembly 24 is completely disposed between the ball element 30 and the inlet portion 18 of the valve body 12. While the internal recess 42 of the valve body 12 depicted in FIG. 1 has been described as including a stepped profile defined by two internal cylindrical surfaces 38a, 38b and two transverse surfaces 40a, 40b, alternative embodiments of the present disclosure can have more or less than two internal cylindrical surfaces and two transverse surfaces depending, for example, on the specific design of the seal assembly 24 and/or other considerations.

Figure 2:
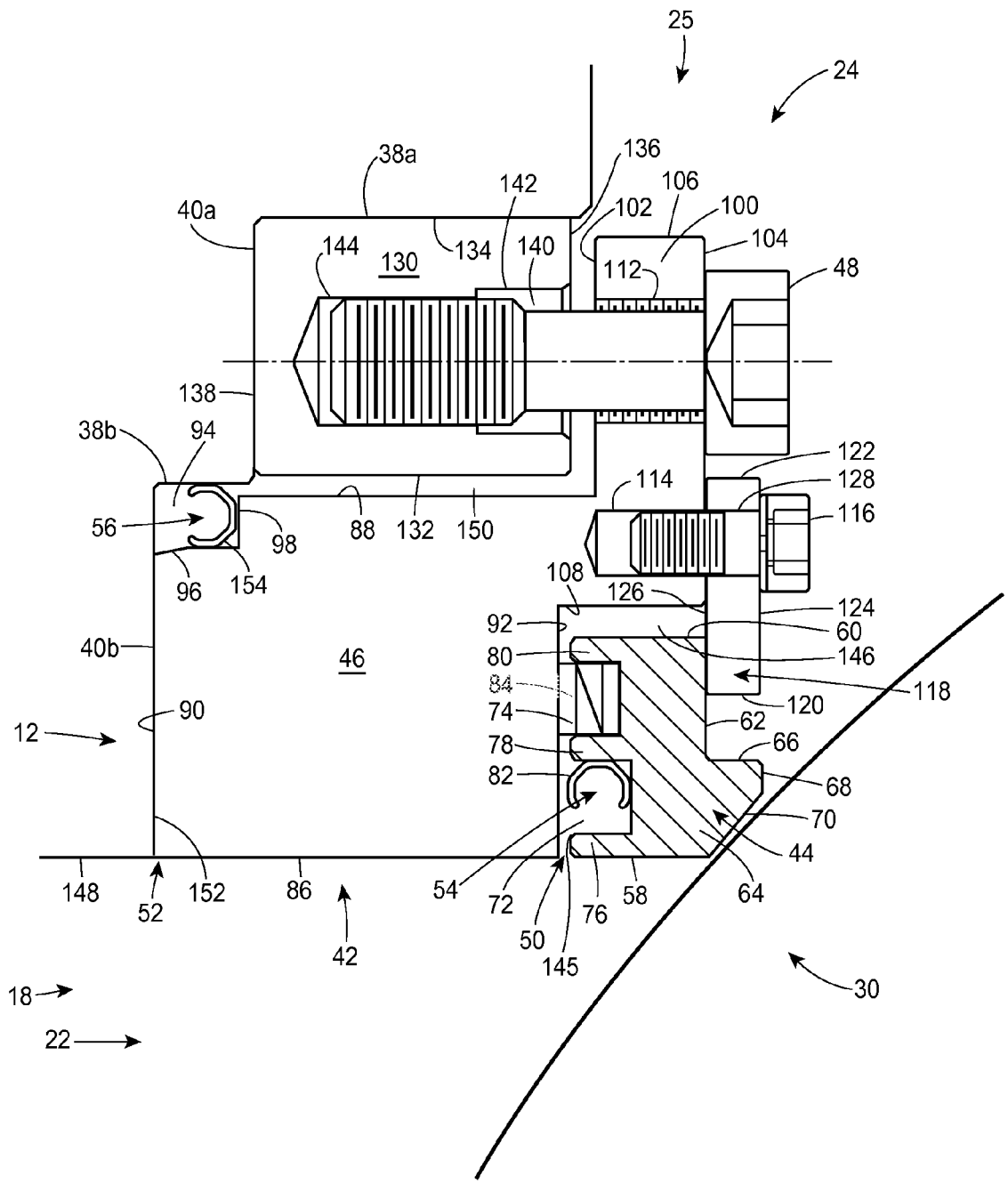
FIG. 2 is an enlarged fragmentary cross-sectional view taken at Circle II of FIG. 1 and illustrating an embodiment of the seal assembly of the rotary ball valve with the rotary ball valve shown in the open position.

Referring now to FIG. 2, which is a detail view taken from Circle II of FIG. 1, one specific embodiment of a seal assembly 24 constructed in accordance with the teachings of the present disclosure will be described.

The seal assembly 24 includes a seal ring 44 disposed within the interior of the valve body 12. The seal ring 44 is biased toward the ball element to sealingly engage the ball element 30. An anchor ring 130 is disposed within the valve interior and secured to the valve body 12 A seal carrier 46 is disposed between the seal ring 44 and the valve body 12, and the seal carrier 46 is removably secured to the anchor ring 130 by a plurality of bolts 48 that are disposed in the interior of the valve body 12. A primary leak path 50 exists between the seal ring 44 and the seal carrier 46 and a secondary leak path 52 exists between the seal carrier 46 and the valve body 12. Both the primary leak path and the secondary leak path are exposed to fluid pressure within the rotary ball valve 10. A first auxiliary seal 54, such as a C-seal 82, is disposed between the seal ring 44 and the seal carrier 46 to prevent fluid flow through the primary leak path 50. In addition, a second auxiliary seal 56, such as a C-seal 154, is disposed between the seal carrier 46 and the valve body 12, and the second auxiliary seal 56 prevents fluid flow through the secondary leak path 52.

As discussed above, the seal ring 44 of the seal assembly 24 is generally annular in shape and may be machined from a wear-resistant metal, such as Alloy 6 or stainless steel with Alloy 6 hardfacing, for example. As illustrated in the cross-sectional view of FIG. 2, the seal ring 44 may be defined laterally by a cylindrical seal inner wall 58 and a cylindrical seal outer wall 60, and a seal top wall 62 may extend from the seal outer wall 60 towards the inner wall 58 in a radial direction. A seal ring protrusion 64 may extend from the seal top wall 62, and the seal ring protrusion 64 may be defined by a cylindrical side protrusion wall 66 that may extend from the seal top wall 62 in an axial direction (i.e., a direction parallel to the longitudinal axis A). A top protrusion wall 68 may extend from the side protrusion wall 66 in a direction parallel to the seal top wall 62. A ball engagement surface 70 may extend between the top protrusion wall 68 and the seal inner wall 58, and the ball engagement surface 70 may be concave in shape. More specifically, the ball engagement surface 70 may be contoured to mate with a corresponding portion of the spherical outer surface of the ball element 30 such that when the rotary ball valve 10 is moved into the closed, or seated, position, the ball engagement surface 70 of the seal ring 44 sealingly engages the ball element 30. The ball engagement surface 70 may be hardfaced to enhance seal cycle life and to prevent seat line galling.

The seal ring 44 also includes an annular inner recess 72 and an annular spring recess 74 disposed between the seal inner wall 58 and the seal outer wall 60. The inner recess 72 and the spring recess 74 may each have a generally rectangular cross-sectional shape and may be adjacently disposed such that an inner ridge 76, an intermediate ridge 78, and an outer ridge 80 are defined in the seal ring 44. However, both the inner recess 72 and the spring recess 74 may have any shape or combination of shapes suitable for a particular application. A bottom portion of each of the inner ridge 76, intermediate ridge 78, and the outer ridge 80 may be axially equidistant from the plane defining the seal top wall 62. The inner recess 72 may be adapted to receive an first auxiliary seal 54, such as the C-seal 82 illustrated in FIGS. 2 and 3. The spring recess 74 may be adapted to receive a resilient element, such as the wave spring 84 illustrated in FIGS. 2 and 3.

Figure 3:
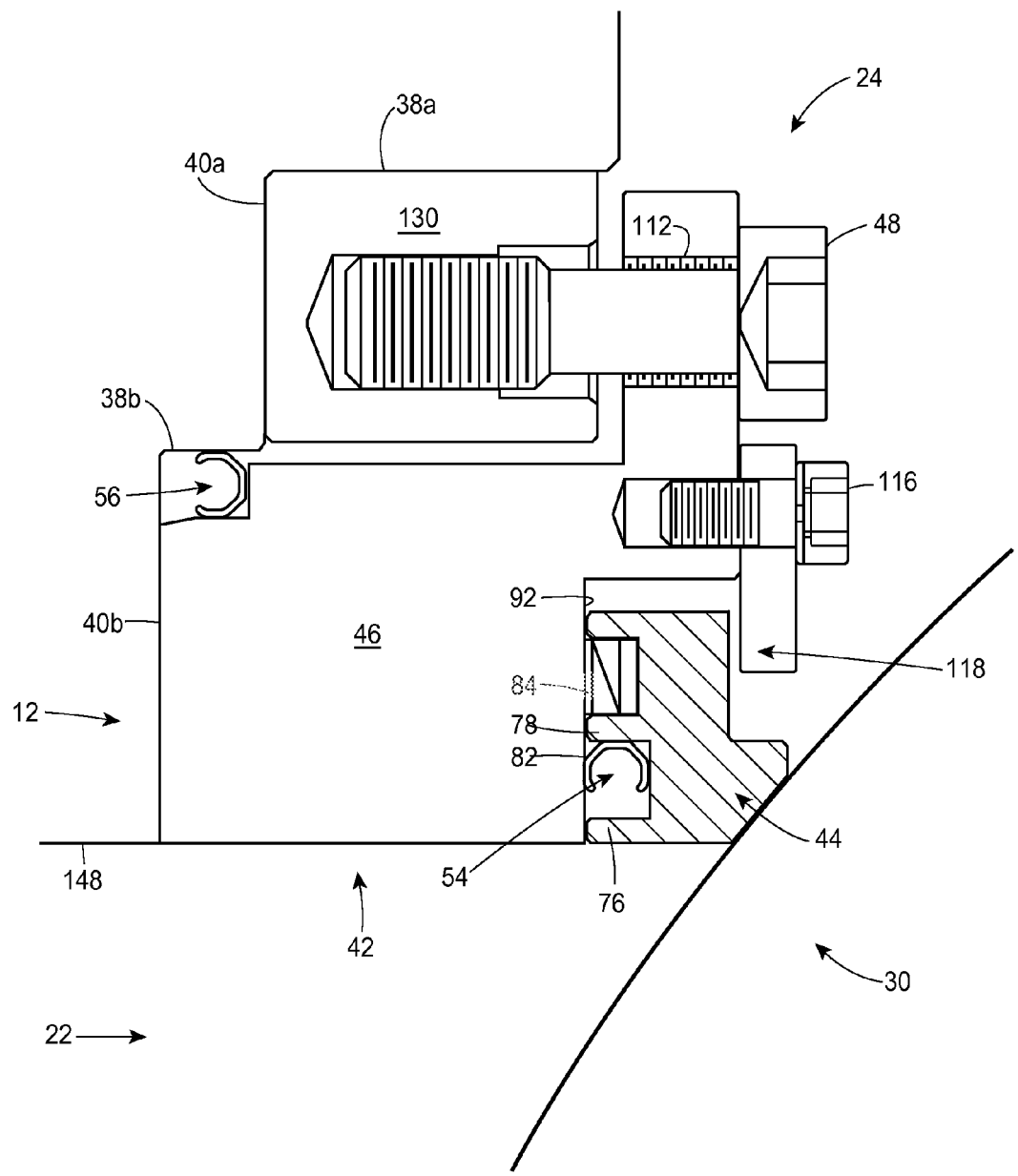
FIG. 3 is another enlarged fragmentary cross-sectional view similar to FIG. 2 and showing the rotary ball valve in the closed position.

As illustrated in FIGS. 2 and 3, the seal assembly 24 also includes an annular seal carrier 46 disposed within the interior of the valve body 12 between the seal ring 44 and the valve body 12. The seal carrier 46 may be machined from a corrosion-resistant metal, such as stainless steel, for example. The seal carrier 46 may be laterally defined by a cylindrical carrier inner wall 86 and a cylindrical carrier outer wall 88 that each extend in a generally axial direction. A planar carrier top wall 90 and a planar carrier bottom wall 92 that is parallel to and offset from the carrier top wall 90 may extend in a generally radial direction and may intersect the carrier inner wall 86 and carrier outer wall 88 to further define the seal carrier 46. A carrier outer recess 94 may be defined by a cylindrical recess side wall 96 axially extending from the carrier bottom wall 92 and a recess top wall 98 radially extending from the carrier outer wall 88 to the recess side wall 96. However, the carrier outer recess 94 may be formed by any number or shape of surfaces that provide a recess where the carrier bottom wall 90 intersects the carrier outer wall 88. An annular carrier flange 100 may extend in a generally radial direction away from the carrier outer wall 88, and the carrier flange 100 may be defined by a flange bottom wall 102 that radially extends away from the carrier outer wall 88. The carrier flange 100 may be further defined by a flange top wall 104 that may be parallel to and offset from the flange bottom wall 102. A cylindrical flange outer wall 106 may axially extend between the flange bottom wall 102 and the flange top wall 104, and a cylindrical flange inner wall 108 may be radially offset from the flange outer wall 106 and may extend between the flange top wall 104 and the carrier top wall 92. Because the carrier top wall 92 is orthogonal to the flange inside wall 108, a carrier inner recess 110 may be formed that is diagonally opposed to the carrier outer recess 94 of the seal carrier 46. A plurality of flange bores 112 may be symmetrically arrayed around the carrier flange 100. The flange bores 112 may axially extend from the flange top wall 104 to the flange bottom wall 102. Each of the flange bores 112 may have a threaded portion, and each of the flange bores 112 may be adapted to receive a threaded captive bolt 48. In addition, a plurality of carrier blind bores 114 may be symmetrically arrayed around the seal carrier 46, and each blind bore 114 may axially extend from the flange top wall 104 towards the carrier bottom wall 90. Each blind bore 114 may have a threaded portion, and each blind bore 114 may be adapted to receive a cap screw 116.

As illustrated in FIGS. 1 and 2, the seal assembly 24 may also include an annular seal retainer 118 adapted to secure the seal ring 44 within the carrier inner recess 110 of the seal carrier 46. The seal retainer 118 may be machined from a corrosion-resistant metal, such as stainless steel, for example. The seal retainer 118 may be laterally defined by a cylindrical retainer inner wall 120 and a cylindrical retainer outer wall 122 that each extend in a generally axial direction. A planar retainer top wall 124 and a planar retainer bottom wall 126 that is parallel to and axially offset from the retainer top wall 124 may extend in a generally radial direction and may intersect the retainer inner wall 120 and retainer outer wall 122 to further define the seal retainer 118. A plurality of retainer bores 128 may be symmetrically arrayed around the seal retainer 118, and each retainer bore 128 may axially extend between the retainer top wall 124 and the retainer bottom wall 126. In addition, each of the retainer bores 128 may be positioned to axially align with a corresponding carrier blind bore 114, and a cap screw 116 may be inserted into each of the retainer bores 128 such that the threaded portion of the cap screw 116 threadedly engages the threaded portion of the carrier blind bore 114, thereby removably securing the seal retainer 118 to the seal carrier 46.

The diameter of the cylindrical retainer inner wall 120 of the seal retainer 118 may be greater than the diameter of the cylindrical side protrusion wall 66 of the seal ring 44 and less than the diameter of the cylindrical seal outer wall 60 of the seal ring 44. Therefore, when the seal ring 44 is disposed within the carrier inner recess 110 of the seal carrier 46 and the seal retainer 118 is secured to the seal carrier 46, the retainer bottom wall 126 extends radially inward past the flange inside wall 108 of the seal carrier 46 such that the cylindrical retainer inner wall 120 is radially disposed between the cylindrical side protrusion wall 66 and the cylindrical seal outer wall 60 of the seal ring 44 regardless of the degree of radial shifting of the seal ring 44 within the carrier inner recess 110 of the seal carrier 46. In addition, when assembled as described above, the axial distance between the seal top wall 62 and a bottom portion of each of the inner ridge 76, intermediate ridge 78, and the outer ridge 80 of the seal ring 44 is smaller than the axial distance between the retainer bottom wall 126 of the seal retainer 118 and the carrier top wall 92 of the seal carrier 46.

As illustrated in FIGS. 1 and 2, the seal assembly 24 may also include an annular anchor ring 130 adapted to be secured to the valve body 12. The anchor ring 130 may be machined from a corrosion-resistant metal, such as stainless steel, for example. The anchor ring 130 may be laterally defined by a cylindrical anchor inner wall 132 and a cylindrical anchor outer wall 134 that each extend in a generally axial direction. A planar anchor top wall 136 and a planar anchor bottom wall 138 that is parallel to and axially offset from the anchor top wall 136 may extend in a generally radial direction and may intersect the anchor inner wall 132 and anchor outer wall 134 to further define the anchor ring 130. The anchor ring 130 may be secured to the valve body 12 in the internal recess 42 of the valve body 12. More specifically, the anchor outer wall 134 may substantially abut the first cylindrical surface 38a of the internal recess 42, and the anchor bottom wall 138 may substantially abut the first transverse surface 40a of the of the internal recess 42. In this position, the diameter of the cylindrical anchor inner wall 132 may be slightly greater than the diameter of the second cylindrical surface 38b of the internal recess 42. To secure the anchor ring 130 to the valve body 12, a threaded portion (not shown) of the anchor outer wall 134 may threadedly engage a threaded portion (not shown) of the first cylindrical surface 38a of the valve body 12. Alternatively, one or more welds (not shown) may secure the anchor ring 130 to the valve body 12, or the anchor ring 130 may be secured to the valve body 12 by a combination of a threaded engagement and welding.

A plurality of anchor bores 140 may be symmetrically arrayed around the anchor ring 130, and each anchor bore 140 may axially extend from the anchor top wall 136 towards the anchor bottom wall 138. In addition, when the anchor ring 130 is secured to the valve body 12, each of the anchor bores 140 may be positioned to axially align with a corresponding flange bore 112 of the seal carrier 46. So configured, a captive bolt 48 may be inserted into each of the threaded flange bores 112 and rotated such that the captive bolt 48 advances towards the corresponding anchor bore 140. After extending through a gap between the flange bottom wall 102 of the seal carrier 46 and the anchor top wall 138 of the anchor ring 130, the distal end of the captive bolt 48 is then received into an enlarged diameter portion 142 before threadedly engaging the threaded portion 144 of the anchor bore 140. During operation, vibrations within the rotary ball valve 10 may cause one or more of the captive bolts 48 to disengage from the threaded portion 144 of the anchor bore 140. Despite this disengagement, the captive bolt 48 is prevented from axial displacement through the flange bore 112 of the seal carrier 46 by the threaded portion of the flange bore 112, thereby preventing the captive bolt 48 from falling out of the anchor bore 140 and into the interior of the valve body 12.

Referring again to FIGS. 2 and 3, the anchor ring 130 may be secured to the valve body 12, and the seal carrier 46 may be secured to the anchor ring 130 by the plurality of captive bolts 48. In addition, the seal ring 44 may be disposed within the carrier inner recess 110 of the seal carrier 46, and the seal ring 44 may be secured within the carrier inner recess 110 by the seal retainer 118 in the manner described above. As explained above, the axial distance between the seal top wall 62 of the seal ring 44 and a bottom portion of each of the inner ridge 76, intermediate ridge 78, and the outer ridge 80 of the seal ring 44 is smaller than the axial distance between the retainer bottom wall 126 of the seal retainer 118 and the carrier top wall 92 of the seal carrier 46. Accordingly, a first gap 145 may exist between the seal ring 44 and the seal carrier 46. The first gap 145 between the seal ring 44 and the seal carrier 46 allows the seal ring 44 to be axially displaced by the ball element 30 towards the inlet 18 (and against the biasing force of the wave spring 84) as the rotary ball valve 10 is moved into the closed position, thereby ensuring that the seal ring 44 sealingly engages the ball element 30. When the rotary ball valve 10 is in an open position (i.e., when the ball element 30 is not in contact with ball engagement surface 70 of the seal ring 44), as illustrated in FIG. 2, the wave spring 84 disposed within the spring recess 74 of the seal ring 44 biases the seal ring 44 towards the ball element 30. Because the seal retainer 118 is secured to the seal carrier 46, the axial distance between the carrier top wall 92 of the seal carrier 46 and the retainer bottom wall 126 is fixed, thereby limiting the axial displacement of the seal ring 44 by the wave spring 84 towards the ball element 30.

In addition to the first gap 145 described above, an alignment gap 146 may exist between the seal carrier 46 and the seal ring 44. More specifically, because the diameter of the cylindrical seal outer wall 60 of the seal ring 44 is smaller than the diameter of the cylindrical flange inside wall 108 of the seal carrier, the alignment gap 146 may exist between the surfaces of the seal ring 44 and the seal carrier 46. Due to the alignment gap 146, the seal ring may radially shift relative to the seal carrier 46 when the seal ring 44 is engaged by the ball element 30, thereby allowing the seal ring 44 to radially and axially self-align to compensate for any ball/seal ring 44 misalignments due to machining tolerances to improve the seal between the seal ring 44 and the ball element 30.

Upon the closing of the rotary ball valve 10, the bottom portion of the inner ridge 76 of the seal ring 44 may not sealingly engage the carrier top wall 92 of the seal carrier 46 creating a primary leak path 50 between the seal ring 44 and the seal carrier 46. For example, the ball element 30 may not axially displace the seal ring 44 such that the first gap 145 between the seal ring 44 and the seal carrier 46 is eliminated. Alternatively, due to an axial shifting of the seal ring 44 relative to the seal carrier 46, the inner ridge 44 of the seal ring 44 may extend radially inward of the carrier inner wall 86 of the seal carrier 46, thereby allowing fluid to flow into the inner recess 72 of the seal ring 44.

Because the process fluid flowing through the flowpath 22 is at a higher pressure on the inlet 18 side of the ball element 30 than on the outlet 20 side, the process fluid has a tendency to flow through the primary leak path 50, which may be in fluid communication with the outlet 20 side of the ball element 30. To prevent process fluid flow through this primary leak path 50, a first auxiliary seal, such as the C-seal 82 illustrated in FIGS. 2 and 3, may be disposed in the inner recess 72 of the seal ring 44.

The mouth of the C-seal 82 may face the general flow path of fluid passing through the primary leak path 50 such that process fluid flowing through the primary leak path 50 enters the mouth of the C-seal 82. In the embodiment illustrated in FIG. 2, the mouth of the C-seal 82 may face the inner ridge 76 of the seal ring 44. The C-seal 82 may be dimensioned such that when the valve 10 is in the open position (as illustrated in FIG. 2) and the seal ring 44 contacts the retainer bottom wall 126 of the seal retainer 118, a portion of the exterior of the C-seal 82 contacts the intermediate ridge 78 and a top surface of the inner recess 72, but does not contact the carrier top wall 92 of the seal carrier 46. Accordingly, when the ball element 30 is in the open position, a portion of the process fluid may flow through the primary leak path 50 between the exterior of the C-seal 82 and the carrier top wall 92 without entering the mouth of the C-seal 82.

When the ball element 30 is moved into the closed position, the ball element 30 contacts the ball engagement surface 70 of the seal ring 44 and displaces the seal ring 44 towards the carrier top wall 92 of the seal carrier 46. As the seal ring 44 is displaced, the distance between the top surface of the inner recess 72 of the seal ring 44 and the carrier top wall 92 of the seal carrier 46 is reduced such that the exterior of the C-seal 82 may contact the carrier top wall 92, the top surface of the inner recess 72, and the intermediate ridge 78 of the seal ring 44. Due to the displacement, the C-seal 82 is moved into the primary leak path 50 such that process fluid may enter the inner recess 72 and the mouth of the C-seal 54 disposed within the inner recess 72. As the relatively high-pressure fluid enters the interior of the C-seal 54 through the mouth, the C-seal 82 outwardly expands such that the outer surface of the C-seal sealingly engages each of the top surface of the inner recess 72 of the seal ring 44 and the carrier top wall 92, thereby preventing process fluid from flowing between the seal ring 44 and the seal carrier 46 downstream of the C-seal 82. In this manner, the C-seal 82 seals the primary leak path 50.

Because the C-seal 82 moves with the seal ring 44 relative to the seal carrier 46 as the ball element 30 engages with and disengages from the seal ring 44, the C-seal 82 is referred to as a dynamic C-seal. The dynamic C-seal 82 may be fabricated from a corrosion-resistant metal, such as N07718 (Inconel 718). Because the dynamic C-seal 82 is made of metal, the rotary ball valve 10 can operate at higher temperatures than valves using elastomeric seals.

When the seal carrier 46 is secured to the anchor ring 130 by the plurality of captive bolts 48 in the manner previously described, the cylindrical carrier inner wall 85 may be substantially coextensive with a cylindrical inlet wall 148 that partially defines the inlet 18. Additionally, the diameter of cylindrical carrier outer wall 88 may be smaller than the anchor inner wall 132, thereby creating a lateral gap 150 between the seal carrier 46 and the anchor ring 130. Because the seal carrier 46 is not directly secured to the valve body 12, a second gap 152 may exist between the second transverse surface 40b of the internal recess 42 of the valve body 12 and the carrier bottom wall 90 of the seal carrier 46. Both the second gap 152 and the lateral gap 150 may be in fluid communication with a portion of the valve interior that is on the outlet 20 side of the seal between the seal ring 44 and the ball element 30 when the rotary ball valve 10 is in the closed position.

Because the process fluid flowing through the flowpath 22 is at a higher pressure on the inlet 18 side of the ball element 30 than on the outlet 20 side, the process fluid has a tendency to flow into the second gap 152 and through the lateral gap 150 to the portion of the valve interior that is on the outlet 20 side of the seal between the seal ring 44 and the ball element 30 when the rotary ball valve 10 is in the closed position. Accordingly, a secondary leak path 52 may exist between the valve body 12 and the seal carrier 46.

To prevent process fluid flow through the secondary leak path 52, a second auxiliary seal 56, such as the C-seal 154 illustrated in FIGS. 2 and 3, may be disposed in the carrier outer recess 94 of the seal carrier 46 such that the mouth of the C-seal 154 faces axially upwards towards the second transverse surface 40b of the valve body 12. As process fluid flows into the first gap 52 of the secondary leak path 52, the fluid enters the carrier outer recess 94 and the mouth of the C-seal 154 disposed within the carrier outer recess 94. As the relatively high-pressure fluid enters the interior of the C-seal 154 through the mouth, the C-seal 154 outwardly expands such that an outer surface of the C-seal 154 sealingly engages the recess side wall 96 and the recess top wall 98 of the carrier outer recess 94 in addition to sealingly engaging the second cylindrical surface 38b of the internal recess 42 of the valve body 12, thereby preventing process fluid from flowing between the seal carrier 46 and the valve body 12 downstream of the C-seal 154. In this manner, the C-seal 154 seals the secondary leak path 52. Because the C-seal 154 is stationary when disposed within the carrier outer recess 94, the C-seal 154 may be referred to as a static C-seal.

As explained previously, when it is desired to remove the seal assembly 24 from the valve body 12, it is not necessary to remove the valve body 12 from the pipeline in which it is mounted. Instead, the valve bonnet 14 may be removed from the valve body 12 by loosening and removing each of the plurality of bonnet bolts 27. With the bonnet 14 removed, the control assembly 16 and the ball element 30 may be removed from the valve body 12 through the bonnet opening 25. Next, the seal carrier 46 may be removed from the anchor ring 130. Specifically, a wrench or other appropriate tool may be inserted into the valve interior through the bonnet opening 25 and each of the captive bolts 48 may be rotated by the wrench until the threaded portion of each captive bolt 48 threadedly disengages from both the threaded portion 144 of the anchor bore 140 and the threaded flange bore 112. The seal carrier 46, with the seal ring 44, seal retainer 118, first and second auxiliary seals 54, 56, and wave spring 74 still attached thereto to form a seal carrier 46 sub-assembly, may then be extracted from the internal recess 42 of the valve body 12 and removed through the bonnet opening 25. Once outside of the valve interior, the seal retainer 118 may be decoupled from the seal carrier 46 by removing each of the cap screws 116. With the seal retainer 118 removed, the seal ring 44 may be removed from the carrier inner recess 110 of the seal carrier 46.

To install the seal assembly 24 to the valve body 12, the seal assembly 24 is first partially assembled outside of the valve interior. Specifically, a C-seal 82 is first placed in the inner recess 72 of the seal ring 44 in the manner previously described, and a resilient element such as the wave spring 84 is placed in the spring recess 74 in the manner previously described. The seal ring 44 is then placed in the carrier inner recess 110 of the seal carrier 46, and the seal retainer 118 is placed over the seal ring 44 such that each retainer bore 128 is axially aligned with a corresponding carrier blind bore 114 formed in the seal carrier 46. Each of the plurality of cap screws 116 is then rotated into threaded engagement with the corresponding carrier blind bore 114 to secure the seal retainer 118 to the seal carrier 46. A C-seal 154 is then placed within the carrier outer recess 94 of the seal carrier 46. The seal carrier 46 sub-assembly is then inserted into the valve interior through the bonnet opening 25, and the seal carrier 46 sub-assembly may be centered within the internal recess 42 of the valve body 12 by aligning the flange outer wall 106 of the seal carrier 46 with the first cylindrical surface 38a of the valve body 12. Each of the flange bores 112 of the seal carrier 46 may then be axially aligned with a corresponding anchor bore 140 of the anchor ring 130. Each of the captive bolts 48 may then inserted into a corresponding flange bore 112 from within the valve interior and rotated until the threaded portion of the captive bolt 48 threadedly engages the threaded portion 144 of the anchor bore 140 of the anchor ring 130. As assembled, the seal ring 44 may not be initially positioned within the carrier inner recess 110 to ensure a proper seal between the ball engagement surface 70 of the seal ring 44 and a portion of the spherical exterior of the ball element 30. However, due to the self-aligning property of the seal ring 44 previously described, the ball element 30 will axially and radially displace the seal ring 44 within the carrier inner recess 110 as the ball element 30 contacts the ball engagement surface 130 during the closing of the rotary ball valve 10.

Figure 4:
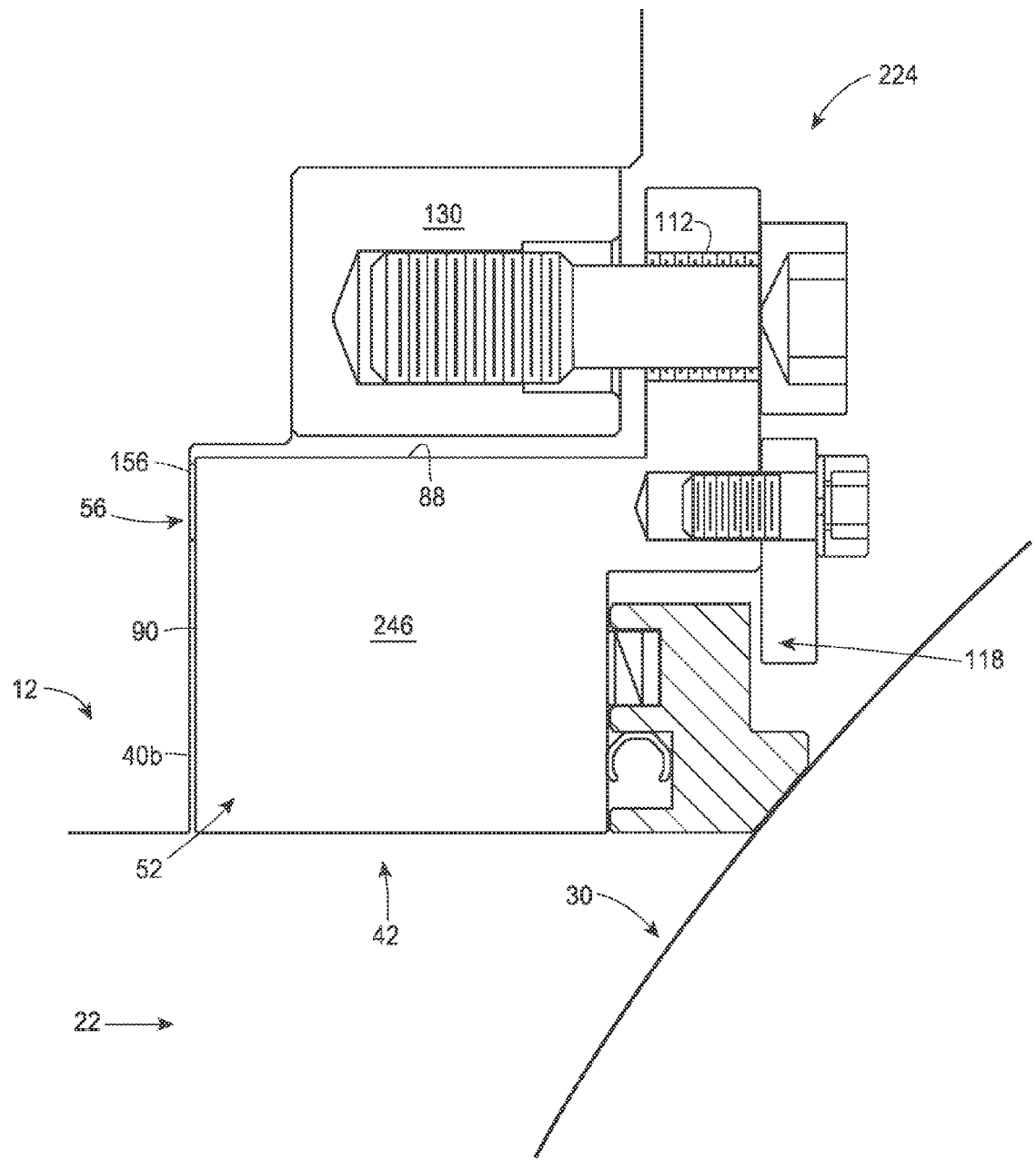
FIG. 4 is another enlarged fragmentary cross-sectional view similar to FIG. 2 but showing a seal assembly assembled in accordance with the teachings of another disclosed example of the present invention.

In another embodiment illustrated in FIG. 4, the seal assembly 224 may be substantially identical to the seal assembly 24 described above. However, in the seal carrier 246 of the seal assembly 224, the cylindrical carrier outer wall 88 of the seal carrier 246 axially extends to the carrier bottom wall 90, and therefore no carrier outer recess 94 is formed. Consequently, the second auxiliary seal 56 of the seal assembly 224 is not a C-seal 154, but is instead an annular gasket 156 disposed in the secondary leak path 52 between the carrier bottom wall 90 and the second transverse surface 40b of the valve body 12. To facilitate handling and installation, the gasket 156 may be bonded to the carrier bottom wall 90 of the seal carrier 246 in any manner that is common in the art.

As configured, the process of removing or installing the seal assembly 224 is substantially identical to the processes described above.

As described, the seal assemblies 24, 224 eliminate several parts used in conventional sealing assemblies, thereby reducing the cost of the valve. Moreover, the parts that are used, such as the seal carrier 46, may be easily and cheaply machined. In addition, the seal carrier 46 sub-assembly may be inserted into the valve interior through the bonnet opening 25 without removing the valve from the pipeline. Furthermore, as explained above, the seal ring 44 may axially and radially move relative to the seal carrier 46, allowing the seal ring 44 to self-align to compensate for ball/seal misalignments.

Figure 5:
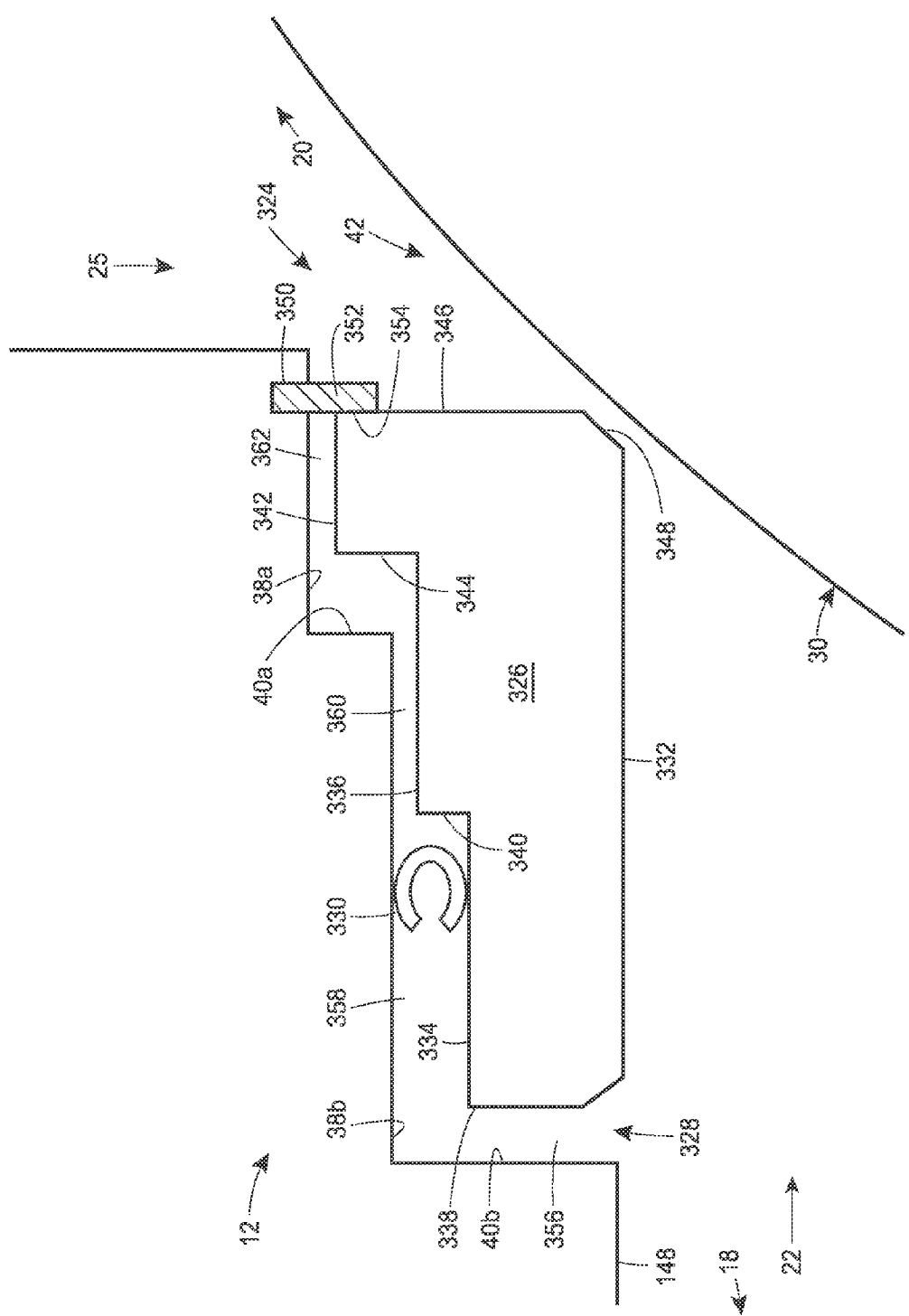
FIG. 5 is one more enlarged fragmentary cross-sectional view similar to FIG. 2 but showing a seal assembly assembled in accordance with the teachings of another disclosed example of the present invention with the rotary ball valve in the open position.
Figure 6:
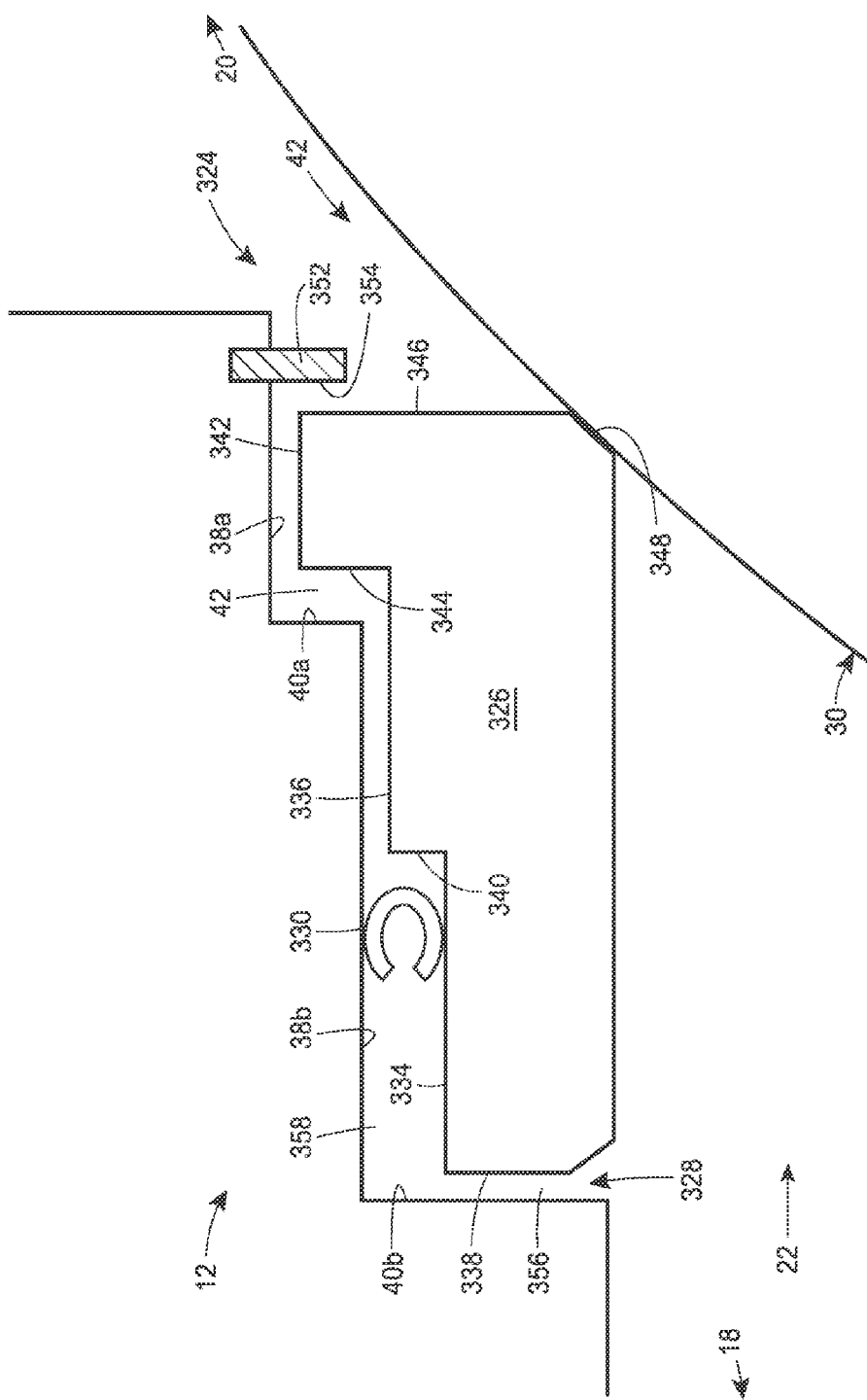
FIG. 6 is another enlarged fragmentary cross-sectional view similar to FIG. 2 and showing the rotary ball valve in the closed position.
Figure 7:
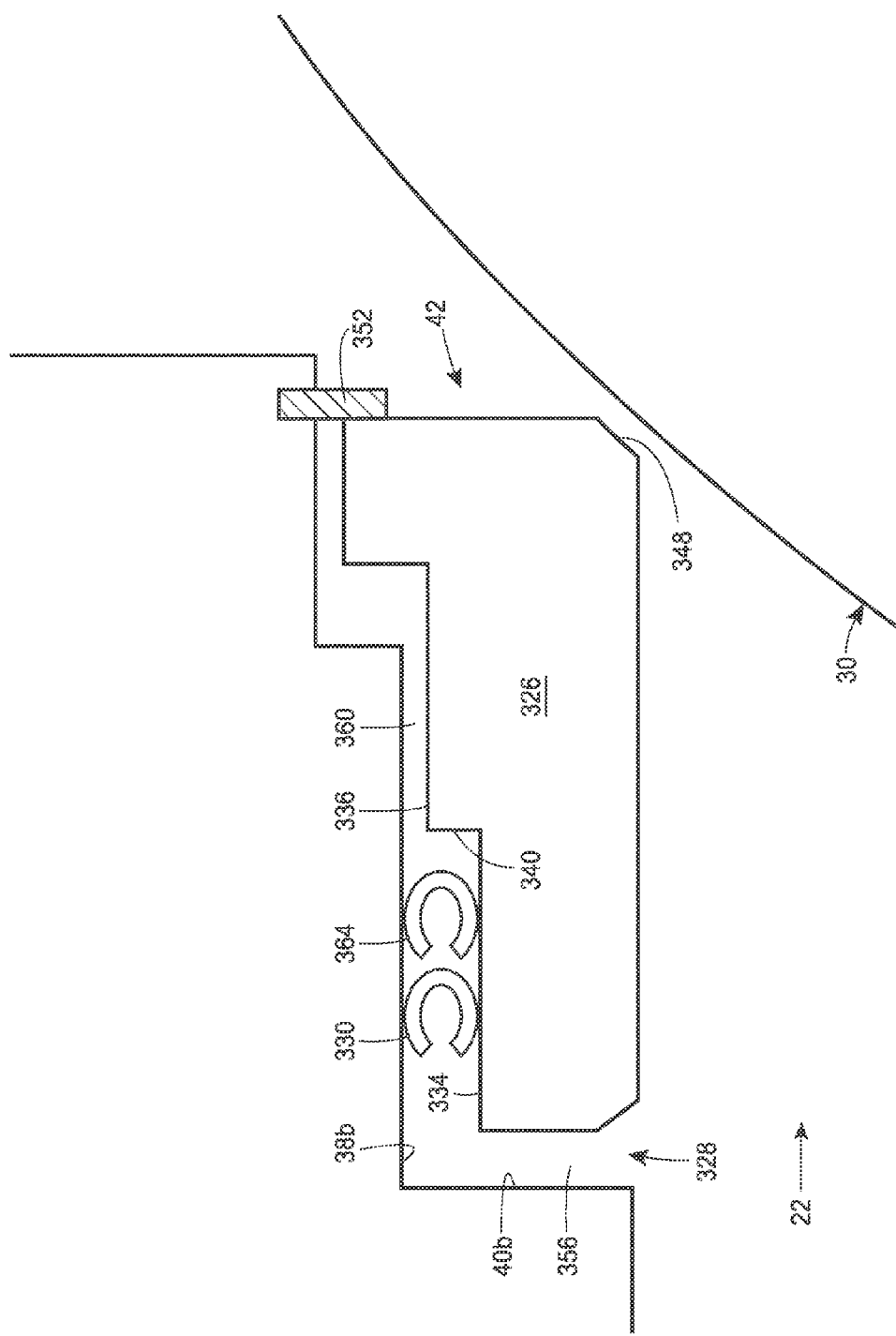
FIG. 7 is another enlarged fragmentary cross-sectional view similar to FIG. 2 but showing a seal assembly assembled in accordance with the teachings of another disclosed example of the present invention having two C-seals.

In a further embodiment illustrated in FIGS. 5 to 7, a seal assembly 324 may include an annular seal ring 326 disposed within the interior of the valve body 12. The seal ring 326 is disposed within the valve interior and biased toward the ball element 30 to sealingly engage the ball element 30. A primary leak path 328 exists between the seal ring 326 and the valve body 12, and the primary leak path is exposed to fluid pressure within the valve. A first C-seal 330 is non-slidably disposed on an exterior surface of the seal ring 326. The first C-seal 330 sealingly engages the seal ring 326 and a portion of the valve body 12 to prevent fluid flow through the primary leak path 328, and wherein the fluid pressure in the first C-seal 330 biases the seal ring 326 towards the ball element 30. In addition, a relative displacement between the seal ring 326 and the portion of the valve body 12 results in a spring force provided by the first C-seal 330 that also biases the seal ring 326 towards the ball element 30.

As explained above, the seal ring 326 of the seal assembly 324 is generally annular in shape and machined from a wear-resistant metal, such as Alloy 6 or stainless steel with Alloy 6 hardfacing, for example. As illustrated in the cross-sectional view of FIGS. 5 and 6, the seal ring 326 may be defined laterally by a cylindrical ring inner wall 332 and may have a stepped outer profile. Specifically, the outer profile may include a cylindrical ring outer wall 334 and a cylindrical ring intermediate wall 336 having a diameter greater than the ring outer wall 334. A ring bottom wall 338 may extend between the ring outer wall 334 and the ring inner wall 332 in a radial direction, and a ring intermediate bottom wall 340 may extend between the ring outer wall 334 and the ring intermediate wall 336 in a radial direction. A cylindrical ring flange wall 342 may have a diameter greater than the ring intermediate wall 336, and a ring flange bottom wall 344 may extend between the ring intermediate wall 336 and the ring flange wall 342 in a radial direction. A ring top wall 346 may inwardly extend from the ring flange wall 342 in a radial direction. A ball engagement surface 348 may extend between the ring top wall 346 and the ring inner wall 332, and the ball engagement surface 348 may be concave in shape. More specifically, the ball engagement surface 348 may be contoured to mate with a corresponding portion of the spherical outer surface of the ball element 30 such that when the rotary ball valve 10 is moved into the closed, or seated, position, the ball engagement surface 348 of the seal ring assembly 324 sealingly engages the ball element 30. The ball engagement surface 348 may be hardfaced to enhance seal cycle life and to prevent seat line galling.

An annular slot 350 may be disposed in the first cylindrical surface 38a of the annular recess 42 of the valve body. An annular clip ring 352 may be at least partially disposed within the slot 350 such that a portion of the clip ring 352 extends axially inward of the first cylindrical surface 38a. When the seal assembly 324 is in an assembled state (i.e., when the seal ring 326 is disposed in the internal recess 42 and the clip ring 352 is received in the slot 350), the axial distance between the second transverse wall 40b and a bottom surface 354 of the clip ring 352 may be greater than the axial distance between the ring bottom wall 338 and the ring top wall 346 of the seal ring 326. Accordingly, the seal ring may axially displace within the internal recess 42 from a position where the ring bottom wall 338 contacts the second transverse surface 40b to a position where the ring top wall 346 contacts the bottom surface 354 of the clip ring 352. A first radial gap 356 may be created when the ring bottom wall 338 is axially offset from the second transverse surface 40b.

Referring to FIGS. 5 and 6, the diameter of the first cylindrical surface 38a of the valve body 12 may be greater than the diameter of the ring flange wall 342, and the diameter of the second cylindrical surface 38b of the valve body 12 may be greater than the diameter of the ring intermediate wall 336. Accordingly, when the seal assembly 324 is in an assembled state, a seal recess 358 may be created between the ring outer wall 334 and the second cylindrical surface 38b. Additionally, a first alignment gap 360 may exist between the ring intermediate wall 336 and the second cylindrical surface 38b of the valve body 12, and a second alignment gap 362 may exist between the ring flange wall 342 and the first cylindrical surface 38a of the valve body 12. Due to the first and second alignment gaps 360, 362, the seal ring 326 may radially shift relative to the valve body 12 when the seal ring 326 is engaged by the ball element 30, thereby allowing the seal ring 326 to radially self-align to compensate for any ball/seal ring misalignments due to machining tolerances to improve the seal between the seal ring 326 and the ball element 30.

As illustrated in FIGS. 5 and 6, a first C-seal 330 may be disposed around the circumference of the ring outer wall 334 of the seal ring 326 such that the first C-seal 330 is disposed within the seal recess 358 when the seal assembly 324 is in an assembled state. The first C-seal 330 may be fabricated from a corrosion-resistant metal, such as N07718 (Inconel 718). The first C-seal 330 may be dimensioned such that the first C-seal 330 may slide across the surface of the ring outer wall 334 during assembly, but will substantially remain in its assembled position on the ring outer wall 334 during the installation of the seal ring 326 within the internal recess 42 of the valve body 12 and during the operation of the valve. Moreover, a portion of the exterior of the first C-seal 330 may contact the second cylindrical surface 38b of the valve body 12 when the seal assembly 324 is in an assembled state, and this interference with the second cylindrical surface 38b may prevent or limit the movement of the first C-seal 330 relative to the second cylindrical surface 38b during the operation of the valve. The mouth of the first C-seal 330 may open in the axial direction toward the second transverse surface 40b of the valve body 12. The first C-seal 330 may be further dimensioned such that in operation, when process fluid enters the mouth of the first C-seal 330, the first C-seal 330 outwardly expands, thereby further preventing the first C-seal 330 from axially displacing relative to the seal ring 326. Because the shape of the first C-seal 330 allows the C-shaped cross-section to compress when an inward radial force is applied, the first C-seal can flex when the seal ring 326 self-aligns as previously described.

In operation, process fluid flowing through the flowpath 22 of the valve is at a higher pressure on the inlet portion 18 side of the ball element 30 than on the outlet portion 20 side. Consequently, the process fluid has a tendency to flow through the first radial gap 356, the seal recess 358, the first alignment gap 360, and the second alignment gap 362 because each may be in fluid communication with the outlet portion 20 side of the ball element 30. Therefore, the first radial gap 356, the seal recess 358, the first alignment gap 360, and the second alignment gap 362 collectively form a primary leak path 328. However, because the first C-seal 330 is disposed within the seal recess 358, process fluid flowing through the primary leak path 328 may enter into the mouth of the first C-seal 330. The pressure resulting from the process fluid flowing into the mouth of the first C-seal 330 may provide an axial force on the first C-seal 330 that has a tendency to axially displace the first C-seal 330 towards the outlet portion 20. Because the first C-seal 330 is non-slidably disposed on the ring outer wall 334 of the seal ring 326, the process fluid within the first C-seal 330 may axially displace the seal ring 326 itself towards the outlet portion 20, thereby biasing the seal ring 326 towards the ball element 30. The seal ring 326 may be displaced towards the outlet portion 20 until the top ring wall 346 contacts the clip ring bottom surface 354. Optionally, a wave spring (not shown) may be disposed between the first transverse surface 40a of the valve body 12 and the ring flange bottom wall 344 to bias the seal ring 36 towards the ball element 30.

When the ball element 30 is moved into the closed position, as shown in FIG. 6, the outer surface of the ball element 30 may engage the contoured ball engagement surface 348 of the seal ring 326, thereby displacing the seal ring 326 towards the inlet portion 18 of the valve 10. However, because the fluid pressure within the first C-seal 330 biases the seal ring 326 towards the ball element 30 in the manner previously described, the ball engagement surface 348 of the seal ring 326 may be maintained in sealing engagement with the ball element 30, preventing process fluid from flowing from the inlet portion 18 to the outlet portion 20. In addition to the force provided by fluid pressure, the first C-seal 330 may provide a spring force that biases the seal ring 326 towards the ball element 30. Specifically, when the ball element 30 is moved into engagement with the seal ring 326 during the closing of the valve, the seal ring 326 may be axially displaced towards the inlet portion 18. Because the first C-seal 330 is non-slidably disposed on the ring outer wall 334 of the seal ring 326, and movement between the first C-seal 330 and the second cylindrical surface 38b is limited or prevented, the axial displacement of the seal ring 326 relative to the second cylindrical surface 38b may cause a portion of the exterior of the first C-seal 330 contacting the seal ring 326 to displace relative to a portion of the exterior of the first C-seal 330 contacting the second cylindrical surface 38b. This relative displacement of the portions of the first C-seal 330 may flex the first C-seal 330, thereby creating a spring force provided by the first C-seal 330 that tends to bias the seal ring 326 towards the ball element 30.

Also in the closed position, as previously explained, process fluid flowing through the primary leak path 328 may enter into the mouth of the first C-seal 330. This process fluid may cause the first C-seal 330 to outwardly expand such that portions of the exterior of the first C-seal 330 sealingly engage each of the ring outer wall 334 of the seal ring 326 and the second cylindrical surface 38b. Accordingly, the first C-seal 330 prevents process fluid from flowing through the primary leak path 328 downstream of the first C-seal 330.

As illustrated in FIG. 7, a second C-seal 364 may be optionally disposed on the ring outer wall 334 of the seal ring 326 between the first C-seal 330 and the ring intermediate bottom wall 340 such that the mouth of the second C-seal 364 may open in the axial direction toward the second transverse surface 40b of the valve body 12. The optional second C-seal 364 may be physically and functionally identical to the first C-seal 330. However, because the first C-seal 330 acts as the primary seal to prevent fluid flow through the primary leak path 328, the second C-seal 364 acts as a back-up to prevent any process fluid that has made it past the first C-seal 330 from advancing further down the primary leak path 328.

When it is desired to remove the seal assembly 324 from the valve body 12, the bonnet 14, the control assembly 16, and the ball element 30 may be removed from the valve body 12 through the bonnet opening 25, as previously described. Next, the clip ring 352 may be extracted from the slot 350 disposed in the first cylindrical surface 38a and may be removed from the valve interior through the bonnet opening 25. The seal ring 326, with the first C-seal 330 (and, optionally, the second C-seal 364) still attached thereto, may then be extracted from the internal recess 42 of the valve body 12 and removed through the bonnet opening 25. Once outside of the valve interior, the first C-seal 330 (and, optionally, the second C-seal 364) may be removed from the seal ring 326 and repaired or replaced.

To install the seal assembly 324 to the valve body 12, the first C-seal 330 (and the second C-seal 364, if desired) may first be positioned in an appropriate location around the ring outer wall 334 of the seal ring 326 while the seal ring 326 is outside of the valve interior. The seal ring 326 may then be inserted into the valve interior through the bonnet opening 25, and the seal ring 326 may be positioned within the internal recess 42 of the valve body 12. The clip ring 352 may then be inserted into the slot 350 in the first cylindrical surface 38a. As assembled, the seal ring 326 may not be initially positioned within the internal recess 42 of the valve body 12 to ensure a proper seal between the ball engagement surface 348 of the seal ring 326 and a portion of the spherical exterior of the ball element 30. However, due to the self-aligning property of the seal ring 326 previously described, the ball element 30 may axially and radially displace the seal ring 326 within the internal recess 42 as the ball element 30 contacts the ball engagement surface 348 during the closing of the rotary ball valve 10.

As described, the seal assembly 324 eliminates several parts used in conventional sealing assemblies, thereby reducing the cost of the valve. Moreover, the parts that are used, such as the seal ring 326, may be easily and cheaply machined. In addition, the use of bolts is not necessary to install the seal assembly 324, thereby reducing costs and eliminating the risk of bolts disengaging during use and damaging the valve or other downstream equipment. Moreover, because the C-seals 330, 364 flex relative to the internal recess 42 of the valve body 12, the seal assembly 324 has a longer life than conventional seal assemblies.

While various embodiments have been described above, this disclosure is not intended to be limited thereto. Variations can be made to the disclosed embodiments that are still within the scope of the appended claims.

What is claimed:

1. A valve comprising:
    a valve body having an inlet, an outlet, and a valve interior in fluid communication with the inlet and outlet;
    a bonnet removably secured to a top portion of the valve body;
    a ball element pivotably mounted in the valve interior, an exterior surface of the ball element defining a portion of a sphere, wherein all points on the exterior surface of the ball element are not equidistant from a central pivot point of the ball element disposed along a rotational axis of the ball element;
    a seal ring disposed within the valve interior and biased toward the ball element, wherein the seal ring is adapted to sealingly engage the ball element;
    an anchor ring disposed within the valve interior and secured to the valve body;
    a seal carrier disposed in the valve interior between the seal ring and the valve body, the seal carrier being removably secured to the anchor ring by a plurality of bolts that are both disposed within the valve interior and adapted to be inserted and removed from within the valve interior, wherein a primary leak path exists between the seal ring and the seal carrier and a secondary leak path exists between the seal carrier and the valve body, the primary leak path and the secondary leak path being exposed to fluid pressure within the valve, wherein a spring engages the seal carrier and the seal ring to bias the seal ring towards the ball element;
    a first auxiliary seal disposed between the seal ring and the seal carrier, the first auxiliary seal preventing fluid flow through the primary leak path, wherein the first auxiliary seal disposed between the seal ring and the seal carrier is a C-seal disposed in a recess formed in the seal ring; and
    a second auxiliary seal disposed between the seal carrier and the valve body, the second auxiliary seal preventing fluid flow through the secondary leak path,
    wherein an alignment gap is formed between the seal ring and the seal carrier, the alignment gap defining a portion of the primary leak path, the alignment gap providing a space between the seal carrier and the seal ring that allows the seal ring to radially move relative to the seal carrier such that the seal ring self-aligns when the ball element sealingly engages the seal ring.

2. The valve of claim 1, wherein a mouth of the C-seal faces a direction of fluid flow passing through the primary leak path.

3. The valve of claim 1, wherein the second auxiliary seal disposed between the seal carrier and the valve body is a C-seal.

4. The valve of claim 3, wherein a mouth of the C-seal faces a direction of fluid flow passing through the secondary leak path.

5. The valve of claim 3, wherein the C-seal is disposed in a recess formed in the seal carrier.

6. The valve of claim 5, wherein the C-seal sealingly engages a portion of the valve body and a portion of the recess formed in the seal carrier to prevent fluid flow through the secondary leak path.

7. The valve of claim 1, wherein the second auxiliary seal disposed between the seal carrier and the valve body is an annular gasket.

8. The valve of claim 1, wherein a wave spring biases the seal ring towards the ball element.

9. The valve of claim 8, wherein the wave spring is disposed in a recess formed in the seal ring.

10. The valve of claim 1, wherein the axial displacement of the seal ring away from the seal carrier is limited by a seal retainer that is coupled to the seal carrier.

11. The valve of claim 10, wherein the seal retainer is removably secured to the seal carrier by a plurality of bolts that are disposed within the valve interior.

12. The valve of claim 1, wherein each of the plurality of bolts threadedly engages a threaded bore formed in a flange portion of the seal carrier and a threaded bore formed in the anchor ring.

13. The valve of claim 1, wherein each of the plurality of bolts is adapted to engage a threaded inner surface of a corresponding threaded bore formed in a flange portion of the seal carrier, and wherein the threaded bore formed in the anchor ring is axially aligned with the threaded bore formed in a flange portion of the seal carrier.

14. A method of installing a seal ring assembly, comprising:
  providing a ball valve including a valve body having an inlet, an outlet, a valve interior in fluid communication with the inlet and outlet, and a bonnet opening adjacent to a top portion of the valve body;
  pivotably mounting a ball element in the valve interior, an exterior surface of the ball element defining a portion of a sphere, wherein all points on the exterior surface of the ball element are not equidistant from a central pivot point of the ball element disposed along a rotational axis of the ball element;
  assembling a seal carrier sub-assembly in a location not within the valve interior, wherein the seal carrier sub-assembly comprises:
    a seal carrier having an inner recess;
    a seal ring disposed within the inner recess, wherein the seal ring is adapted to sealingly engage the ball element;
    a first auxiliary seal disposed between the seal ring and seal carrier; and
    a second auxiliary seal coupled to the seal carrier;
  inserting the seal carrier sub-assembly into the bonnet opening such that the seal carrier sub-assembly is disposed within the valve interior;
  threading at least one of a plurality of bolts through a corresponding threaded aperture formed in a flange portion of the seal carrier prior to inserting the seal carrier sub-assembly into the bonnet opening such that the at least one of the plurality of bolts is retained within the threaded aperture while inserting the seal carrier sub-assembly into the bonnet opening;
  securing the seal carrier sub-assembly to the valve body such that the first auxiliary seal prevents fluid from flowing through a primary leak path that exists between the seal ring and the seal carrier and such that the second auxiliary seal prevents fluid from flowing through a secondary leak path that exists between the seal carrier and the valve body; and
  securing a bonnet to the valve body to cover the bonnet opening.

15. The method of installing the seal ring assembly of claim 14, wherein securing the seal carrier sub-assembly to the valve body includes threading the at least one of the plurality of bolts through a corresponding threaded aperture formed in an anchor ring that is secured to the valve body.

16. A valve comprising:
  a valve body having an inlet, an outlet, and a valve interior in fluid communication with the inlet and outlet;
  a bonnet removably secured to a top portion of the valve body;
  a ball element pivotably mounted in the valve interior, an exterior surface of the ball element defining a portion of a sphere, wherein all points on the exterior surface of the ball element are not equidistant from a central pivot point of the ball element disposed along a rotational axis of the ball element;
  a seal ring disposed within the valve interior and biased toward the ball element, wherein the seal ring is adapted to sealingly engage the ball element, and wherein a primary leak path exists between the seal ring and the valve body, the primary leak path being exposed to fluid pressure within the valve, wherein the seal ring is disposed in an inner recess in an interior portion of the valve body, and a clip ring disposed around a portion of the inner recess limits the axial displacement of the seal ring towards the ball element; and
  a first C-seal non-slidably disposed on an exterior surface of the seal ring, the first C-seal sealingly engaging the seal ring and a portion of the valve body to prevent fluid flow through the primary leak path, and wherein the fluid pressure in the first C-seal biases the seal ring towards the ball element, and wherein a relative displacement between the seal ring and the portion of the valve body results in a spring force provided by the first C-seal that also biases the seal ring towards the ball element, wherein a mouth of the first C-seal is unobstructed and wherein the first C-seal does not disengage the portion of the valve body regardless of whether fluid flows through the primary leak path.

17. The valve of claim 16, wherein a second C-seal is non-slidably disposed on the exterior surface of the seal ring, the second C-seal positioned adjacent to the first C-seal, and the second C-seal sealingly engaging the seal ring and the valve body to prevent fluid flow through the primary leak path.

18. The valve of claim 16, wherein at least one alignment gap is formed between the seal ring and the valve body, the alignment gap defining a portion of the primary leak path, the alignment gap providing a space between the seal ring and the valve body that allows the seal ring to radially move relative to the valve body such that the seal ring self-aligns when the ball element sealingly engages the seal ring.

19. A valve comprising:
  a valve body having an inlet, an outlet, and a valve interior in fluid communication with the inlet and outlet;
  a bonnet removably secured to a top portion of the valve body;
  a ball element pivotably mounted in the valve interior, an exterior surface of the ball element defining a portion of a sphere, wherein all points on the exterior surface of the ball element are not equidistant from a central pivot point of the ball element disposed along a rotational axis of the ball element;
  a seal ring disposed within the valve interior and biased toward the ball element, wherein the seal ring is adapted to sealingly engage the ball element;
  an anchor ring disposed within the valve interior and secured to the valve body;
  a seal carrier disposed in the valve interior between the seal ring and the valve body, the seal carrier being removably secured to the anchor ring by a plurality of bolts that are both disposed within the valve interior and adapted to be inserted and removed from within the valve interior, wherein a primary leak path exists between the seal ring and the seal carrier and a secondary leak path exists between the seal carrier and the valve body, the primary leak path and the secondary leak path being exposed to fluid pressure within the valve;
  a first auxiliary seal disposed between the seal ring and the seal carrier, the first auxiliary seal preventing fluid flow through the primary leak path; and
  a second auxiliary seal disposed between the seal carrier and the valve body, the second auxiliary seal preventing fluid flow through the secondary leak path,
  wherein each of the plurality of bolts threadedly engages a threaded bore formed in a flange portion of the seal carrier and a threaded bore formed in the anchor ring.

20. A valve comprising:
  a valve body having an inlet, an outlet, and a valve interior in fluid communication with the inlet and outlet;
  a bonnet removably secured to a top portion of the valve body;

a ball element pivotably mounted in the valve interior, an exterior surface of the ball element defining a portion of a sphere, wherein all points on the exterior surface of the ball element are not equidistant from a central pivot point of the ball element disposed along a rotational axis of the ball element;

a seal ring disposed within the valve interior and biased toward the ball element, wherein the seal ring is adapted to sealingly engage the ball element;

an anchor ring disposed within the valve interior and secured to the valve body;

a seal carrier disposed in the valve interior between the seal ring and the valve body, the seal carrier being removably secured to the anchor ring by a plurality of bolts that are both disposed within the valve interior and adapted to be inserted and removed from within the valve interior, wherein a primary leak path exists between the seal ring and the seal carrier and a secondary leak path exists between the seal carrier and the valve body, the primary leak path and the secondary leak path being exposed to fluid pressure within the valve, wherein a spring engages the seal carrier and the seal ring to bias the seal ring towards the ball element;

a first auxiliary seal disposed between the seal ring and the seal carrier, the first auxiliary seal preventing fluid flow through the primary leak path, wherein the first auxiliary seal disposed between the seal ring and the seal carrier is a C-seal disposed in a recess formed in the seal ring; and a second auxiliary seal disposed between the seal carrier and the valve body, the second auxiliary seal preventing fluid flow through the secondary leak path, wherein a wave spring biases the seal ring towards the ball element, and wherein the wave spring is disposed in a recess formed in the seal ring.

21. A valve comprising:

a valve body having an inlet, an outlet, and a valve interior in fluid communication with the inlet and outlet;

a bonnet removably secured to a top portion of the valve body;

a ball element pivotably mounted in the valve interior, an exterior surface of the ball element defining a portion of a sphere, wherein all points on the exterior surface of the ball element are not equidistant from a central pivot point of the ball element disposed along a rotational axis of the ball element;

a seal ring disposed within the valve interior and biased toward the ball element, wherein the seal ring is adapted to sealingly engage the ball element;

an anchor ring disposed within the valve interior and secured to the valve body;

a seal carrier disposed in the valve interior between the seal ring and the valve body, the seal carrier being removably secured to the anchor ring by a plurality of bolts that are both disposed within the valve interior and adapted to be inserted and removed from within the valve interior, wherein a primary leak path exists between the seal ring and the seal carrier and a secondary leak path exists between the seal carrier and the valve body, the primary leak path and the secondary leak path being exposed to fluid pressure within the valve, wherein a spring engages the seal carrier and the seal ring to bias the seal ring towards the ball element;

a first auxiliary seal disposed between the seal ring and the seal carrier, the first auxiliary seal preventing fluid flow through the primary leak path, wherein the first auxiliary seal disposed between the seal ring and the seal carrier is a C-seal disposed in a recess formed in the seal ring; and a second auxiliary seal disposed between the seal carrier and the valve body, the second auxiliary seal preventing fluid flow through the secondary leak path, wherein each of the plurality of bolts is adapted to engage a threaded inner surface of a corresponding threaded bore formed in a flange portion of the seal carrier, and wherein the threaded bore formed in the anchor ring is axially aligned with the threaded bore formed in a flange portion of the seal carrier.

22. A valve comprising:

a valve body having an inlet, an outlet, and a valve interior in fluid communication with the inlet and outlet;

a bonnet removably secured to a top portion of the valve body;

a ball element pivotably mounted in the valve interior, an exterior surface of the ball element defining a portion of a sphere, wherein all points on the exterior surface of the ball element are not equidistant from a central pivot point of the ball element disposed along a rotational axis of the ball element;

a seal ring disposed within the valve interior and biased toward the ball element, wherein the seal ring is adapted to sealingly engage the ball element;

an anchor ring disposed within the valve interior and secured to the valve body;

a seal carrier disposed in the valve interior between the seal ring and the valve body, the seal carrier being removably secured to the anchor ring by a plurality of bolts that are both disposed within the valve interior and adapted to be inserted and removed from within the valve interior, wherein a primary leak path exists between the seal ring and the seal carrier and a secondary leak path exists between the seal carrier and the valve body, the primary leak path and the secondary leak path being exposed to fluid pressure within the valve, wherein a spring engages the seal carrier and the seal ring to bias the seal ring towards the ball element;

a first auxiliary seal disposed between the seal ring and the seal carrier, the first auxiliary seal preventing fluid flow through the primary leak path, wherein the first auxiliary seal disposed between the seal ring and the seal carrier is a C-seal disposed in a recess formed in the seal ring; and a second auxiliary seal disposed between the seal carrier and the valve body, the second auxiliary seal preventing fluid flow through the secondary leak path, wherein the axial displacement of the seal ring away from the seal carrier is limited by a seal retainer that is coupled to the seal carrier.

23. The valve of claim 22, wherein the seal retainer is removably secured to the seal carrier by a plurality of bolts that are disposed within the valve interior.

* * * * *